United States Patent
Sagiraju et al.

(10) Patent No.: US 9,784,846 B2
(45) Date of Patent: Oct. 10, 2017

(54) SYSTEM, METHOD, AND APPARATUS FOR COMPENSATING FOR IONOSPHERIC DELAY IN A MULTI CONSTELLATION SINGLE RADIO FREQUENCY PATH GNSS RECEIVER

(71) Applicant: Samsung Electronics Co., Ltd., Gyeonggi-do (KR)

(72) Inventors: Phanikrishna Sagiraju, Cedar Rapids, IA (US); William Nolte, Atkins, IA (US)

(73) Assignee: Samsung Electronics Co., Ltd. (KR)

( * ) Notice: Subject to any disclaimer, the term of this patent is extended or adjusted under 35 U.S.C. 154(b) by 708 days.

(21) Appl. No.: 14/215,835

(22) Filed: Mar. 17, 2014

(65) Prior Publication Data

US 2015/0054686 A1    Feb. 26, 2015

Related U.S. Application Data (60) Provisional application No. 61/868,309, filed on Aug. 21, 2013.

(51) Int. Cl.
| | | |
|---|---|---|
| G01S 19/33 | (2010.01) | |
| G01S 19/39 | (2010.01) | |
| G01S 19/07 | (2010.01) | |
| G01S 19/51 | (2010.01) | |
| G01S 19/40 | (2010.01) | |

(52) U.S. Cl.
CPC ............. *G01S 19/39* (2013.01); *G01S 19/07* (2013.01); *G01S 19/40* (2013.01); *G01S 19/51* (2013.01)

(58) Field of Classification Search
CPC ........... G01S 19/07; G01S 19/39; G01S 19/51
USPC .................... 342/357.44, 357.73, 357.34
See application file for complete search history.

(56) References Cited

U.S. PATENT DOCUMENTS

| | | | | |
|---|---|---|---|---|
| 5,796,773 A | * | 8/1998 | Sheynblat | G01S 19/32 342/357.44 |
| 6,016,121 A | * | 1/2000 | Bogensberger | G01S 19/32 342/357.72 |
| 6,031,489 A | * | 2/2000 | Wyrwas | G01S 5/12 342/357.2 |
| 6,040,798 A | | 3/2000 | Kinal et al. | |
| 6,163,295 A | | 12/2000 | Nagasamy et al. | |
| 6,407,700 B1 | | 6/2002 | Giffard | |
| 6,469,663 B1 | * | 10/2002 | Whitehead | G01S 19/44 342/357.31 |

(Continued)

OTHER PUBLICATIONS

"Real-Time Estimation of Ionospheric Delay using Dual Frequency GPS Observations"; Dhiraj Sunehra; European Scientific Journal; May 2013; vol. 9, No. 15.*

(Continued)

*Primary Examiner* — Chuong P Nguyen
(74) *Attorney, Agent, or Firm* — The Farrell Law Firm, P.C.

(57) ABSTRACT

Systems, methods, and apparatuses are provided for compensating for ionospheric delay in multi constellation Global Navigation Satellite Systems (GNSSs). In one method, a single Radio Frequency (RF) path receiver receives a first signal at a first frequency from a first satellite in a first GNSS constellation, receives a second signal at a second frequency from a second satellite in a second GNSS constellation, and calculates the ionospheric delay using the received first signal and the received second signal.

14 Claims, 4 Drawing Sheets

(56) References Cited

U.S. PATENT DOCUMENTS

| | | |
|---|---|---|
| 6,781,542 B2 | 8/2004 | Hoven et al. |
| 7,436,354 B2 * | 10/2008 | Lee .................. G01S 19/46 342/357.29 |
| 7,768,449 B2 * | 8/2010 | Gaal .................. G01S 19/25 342/357.73 |
| 7,961,141 B2 | 6/2011 | Dai et al. |
| 9,411,051 B2 * | 8/2016 | Sagiraju .............. G01S 19/28 |
| 2011/0025555 A1 * | 2/2011 | Whitehead ........... G01S 19/33 342/357.24 |
| 2011/0050494 A1 * | 3/2011 | Damidaux ............ G01S 19/07 342/357.44 |
| 2016/0282470 A1 * | 9/2016 | McDonald ............ G01S 19/05 |
| 2017/0139052 A1 * | 5/2017 | Skalicky .............. G01S 19/20 |

OTHER PUBLICATIONS

Single-Frequency GNSS retrieval of vertical total electron content (VTEC) with GPS L1 and Galileo E5 measurements.
Precise ionosphere-free single-frequency GNSS positioning; Torben Schuler-Herman Diessongo.

* cited by examiner

SYSTEM, METHOD, AND APPARATUS FOR COMPENSATING FOR IONOSPHERIC DELAY IN A MULTI CONSTELLATION SINGLE RADIO FREQUENCY PATH GNSS RECEIVER

PRIORITY

This application claims priority under 35 U.S.C. §119(e) to U.S. Provisional Patent Application Ser. No. 61/868,309 filed on Aug. 21, 2013, the entire disclosure of which is incorporated herein by reference.

BACKGROUND OF THE INVENTION

1. Field of the Invention

The present invention relates generally to satellite signal reception, and more particularly, to compensating for ionospheric delay in a multi constellation single Radio Frequency (RF) path Global Navigation Satellite Systems (GNSSs) receiver, hereinafter referred to as "a single frequency receiver."

2. Description of the Related Art

Ionospheric interference is a common problem encountered in GNSSs. The ionosphere is a dispersive medium, which lies between seventy and one thousand kilometers above the Earth's surface, and effects a certain, frequency dependent propagation delay on signals transmitted from GNSS satellites. The ionosphere also affects GNSS signal tracking by a receiver. Notably, the ionospheric delay of a transmitted GNSS signal can cause an error of up to ten meters when calculating the exact geographic position on the Earth's surface of the receiver.

Delay from ionospheric interference can be almost completely corrected for by using multiple frequency observations, e.g., by transmitting and receiving signals at two different Global Positioning System (GPS) frequencies L1 and L2, from a single satellite. However, most GPS receivers do not receive both L1 and L2 frequencies.

Ionospheric delay cannot be eliminated in a conventional single frequency GNSS receiver, as a true Total Electron Count (TEC) value is very difficult to model and is highly sensitive to various parameters. Instead, these single (i.e., L1) frequency receivers often use ionospheric modeling, e.g., a Klobuchar Ionospheric Model or a NeQuick Ionospheric Model, to estimate and correct for transmission delay due to ionospheric interference.

Accordingly, a solution is needed for an apparatus and method for compensating for the ionospheric delay in a multi constellation, single frequency GNSS receiver, without the complexity or cost associated with dual frequency receivers and ionospheric modeling.

SUMMARY OF THE INVENTION

The present invention addresses at least the problems and disadvantages described above, and provides at least the advantages described below.

Accordingly, an aspect of the present invention is to provide a single frequency receiver and method for compensating for ionospheric delay in multi constellation GNSSs.

Another aspect of the present invention is to provide a single frequency receiver and method for calculating ionospheric delay using two satellite signals transmitted from two satellites in different GNSS constellations.

In accordance with an embodiment of the present invention, a method for a single Radio Frequency (RF) path receiver to compensate for ionospheric delay in multi constellation Global Navigation Satellite Systems (GNSSs) is provided. The method includes receiving a first signal at a first frequency from a first satellite in a first GNSS constellation; receiving a second signal at a second frequency from a second satellite in a second GNSS constellation; and calculating the ionospheric delay using the received first signal and the received second signal.

In accordance with an embodiment of the present invention, a single Radio Frequency (RF) path receiver is provided that compensates for ionospheric delay in multi constellation Global Navigation Satellite Systems (GNSSs). The receiver includes an antenna configured to receive a first signal at a first frequency from a first satellite in a first GNSS constellation, and to receive a second signal at a second frequency from a second satellite in a second GNSS constellation; a processor; and a non-transitory computer-readable medium having program instructions recorded thereon, the program instructions configured for the processor to calculate the ionospheric delay using the received first signal and the received second signal.

In accordance with an embodiment of the present invention, a navigation system is provided, which includes a first satellite in a first Global Navigation Satellite System (GNSS) constellation; a second satellite in a second GNSS constellation; and a single Radio Frequency (RF) path receiver configured to receive a first signal at a first frequency from the first satellite, receive a second signal at a second frequency from the second satellite, and calculate ionospheric delay using the received first signal and the received second signal.

BRIEF DESCRIPTION OF THE DRAWINGS

The above and other aspects, features and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

The ionosphere is the zone of the terrestrial atmosphere that extends from about 60 km to more than 2000 km in height, and includes a partially ionized medium, as a result of the X and UltraViolet (UV) rays of solar radiation and the incidence of charged particles. The propagation speed of GNSS electromagnetic signals in the ionosphere depends on its electron density, which is typically driven by two main processes. During the day, sun radiation causes ionization of neutral atoms producing free electrons and ions. However, during the night, a recombination process prevails, where free electrons are recombined with ions to produce neutral particles, which leads to a reduction in the electron density.

Dispersion is caused by interaction of GNSS signals with the ionosphere. Dispersion relations describe the effect of dispersion from a medium on the properties of a wave traveling within that medium. A dispersion relation connects different properties of the wave such as its energy, frequency, wavelength, wave number, etc.

Dispersion relations are more commonly expressed in terms of the angular frequency $\omega=2\pi f$ and the wave number $$k = \frac{2\pi}{\lambda}.$$

For electromagnetic waves in a vacuum, frequency is proportional to a wave number $\omega=ck$, where c is the propagation speed of a signal in the vacuum.

In the case with the ionosphere, $\omega$ and k are related in first order, as shown in Equation (1) below.

$$\omega^2 = c^2 k^2 + \omega_p^2 \qquad (1)$$

In Equation (1), $\omega_p$ is the critical frequency of the ionospheric plasma, which can be calculated using Equation (2).

$$\omega_p = 2\pi f_p \text{ with } f_p = 8.98\sqrt{N_e} \text{ in Hz.} \qquad (2)$$

In Equation (2), $N_e$ is the electron density (in $e^-/m^3$).

Equation (1) is named the Relation of Dispersion of the ionosphere, and $\omega_p$ is the critical frequency of the ionospheric plasma, in the sense that signals with $\omega<\omega_p$ will be reflected and signals with $\omega>\omega_p$ will cross through the plasma.

The electron density in the ionosphere changes with height having a maximum of $N_e \sim 10^{11}$-$10^{12} e^-/m^3$ around 300-500 Km. Hence, electromagnetic signals with $f > f_p \sim 10^6$ Hz will be able to cross the ionosphere. This is the case of GNSS signals of which frequencies are at the order of 1 GHz=$10^9$ Hz. Accordingly, radio signals with frequencies less than $10^6$ Hz will be reflected in the ionosphere.

From Equation (1), $\omega=2\pi f$, and the definition of Phase & Group Velocity follows using Equations (3) and (4).

$$v_{ph} = \frac{\omega}{k}, v_{gr} = \frac{\partial \omega}{\partial k} \qquad (3)$$

Hence, $$v_{ph} = \frac{c}{\sqrt{1-\left(\frac{f_p}{f}\right)^2}} \qquad (4)$$

The phase refractive index of the ionosphere can be approximated as shown in Equations (5) and (6).

$$n_{ph} = \frac{c}{v_{ph}}, n_{gr} = \frac{c}{v_{gr}} \qquad (5)$$

$$n_{ph} = \sqrt{1-\left(\frac{f_p}{f}\right)^2} \cong 1 - \frac{1}{2}\left(\frac{f_p}{f}\right)^2 = 1 - \frac{40.3}{f^2} N_e \qquad (6)$$

At the frequency of the GNSS signals, the previous approximation in Equation (6) accounts for more than the 99.9% of the refractivity (a first order ionospheric effect). That is, with less than a 0.1% of error, Equation (7) can be assumed.

$$n_{ph} = 1 - \frac{40.3}{f^2} N_e \qquad (7)$$

Differentiating Equation (1) with respect to k and taking into account Equations (3) and (5) and the approximation $(1-\epsilon^2)^{-1/2} = 1 + 1/2\epsilon^2$, yields the group refractive index, as shown in Equation (8).

$$n_{gr} = 1 - \frac{40.3}{f^2} N_e \qquad (8)$$

The difference between the measured range (with the frequency f signal) and the Euclidean distance between the satellite and receiver is given by Equation (9).

$$\Delta = \int_{straight\ line} (n-1) dl \qquad (9)$$

Substituting the phase and group refraction indices from Equations (7) and (8), is shown below in Equation (10).

$$\Delta_{ph,f}^{iono} = -\frac{40.3}{f^2} \int N_e dl \quad \Delta_{gr,f}^{iono} = -\frac{40.3}{f^2} \int N_e dl. \qquad (10)$$

As a result, phase measurements suffer advancement when crossing the ionosphere, i.e., a negative delay occurs, and the code measurements suffer a positive delay.

The differences $\Delta_{ph,f}^{iono}$ and $\Delta_{gr,f}^{iono}$ are referred to as the phase and code ionospheric refraction and, the integral is defined as the Slant TEC (STEC), which is shown in Equation (11).

$$STEC = \int N_e dl \qquad (11)$$

Usually, the STEC is given in TEC Units (TECUs), where 1 TECU=$10^{16} e^-/m^3$ and the ionospheric delay $I_f$ (at the frequency f) is written as shown in Equation (12), $$I_f \equiv \Delta_{gr,f}^{iono} = \alpha_f STEC \text{ (units:meters of delay)} \qquad (12)$$

with $$\alpha_f = \frac{40.3 \cdot 10^{16}}{f^2} m_{signal\ delay\ (at\ frequency\ f)} / TECU \text{ (where } f \text{ is in Hz)} \qquad (13)$$

As described above, the TEC, and hence, the ionospheric refraction depends on the geographic location of the receiver, the hour of day, and solar activity. As the ionosphere is a dispersive media, the GNSS signals refraction depends on its frequencies (as the squared inverse). Further, because the true TEC value is very difficult to model and highly sensitive to various parameters, in single frequency receivers the ionospheric correction models (Klobuchar Ionospheric Model or NeQuick Ionospheric Model) are used to remove this effect that can reach up to several tens of meters. However, it has been adequately shown that these models correct no more than 50% of the ionospheric transmission delay.

Further, this large error provides an opportunity for a better method to correct for ionospheric errors in a single frequency, multi-GNSS receiver.

As described above, a dual frequency receiver can virtually eliminate ionospheric errors by computing the pseudo range distance of the satellite on both of the received frequencies from a satellite. For the purpose of illustration, a short derivation of such a dual frequency correction methodology is shown below.

$\Delta_1$ and $\Delta_2$ represent errors, i.e., ionospheric delay, at frequencies $f_1$ and $f_2$, respectively.

Further, $$\Delta_1 = \rho_1 - R = -40.3 \frac{TEC}{f_1^2} \text{ and } \Delta_2 = \rho_2 - R = -40.3 \frac{TEC}{f_2^2},$$

where $\rho_1$ and $\rho_2$ are the pseudo range distances computed at frequencies $f_1$ and $f_2$, and R is the true geometric range of the satellite to the receiver.

Because both frequencies are transmitted by the same satellite, the true geometric range is R cancelled out.

As a result of the cancellation of the true geometric range R, $$\frac{\Delta_1}{\Delta_2} = \frac{f_2^2}{f_1^2}$$

and $\Delta_1 - \Delta_2 = \rho_1 - \rho_2$.

Further, $\Delta_1$ can then be obtained as shown below in Equation (14).

$$\Delta_1 = \left(\frac{f_2^2}{f_2^2 - f_1^2}\right)(\rho_1 - \rho_2) \quad (14)$$

From the above Equations, it can be observed that all of the quantities are either known or can be measured, with TEC values totally cancelled from the Equations. Hence, when using dual frequencies, ionospheric effects can be completely eliminated.

In accordance with an embodiment of the present invention, in order to compensate for the ionospheric delay in a single frequency GNSS receiver, without the complexity or cost associated with dual frequency receivers and ionospheric modeling, a method is provided, which does not track two different frequencies from the same satellite, but tracks two different satellites from different constellations, which are close enough to each other in azimuth and elevation, such that the paths of signals transmitted therefrom cross the ionosphere very similarly. As a result, the TEC is common between the two signal paths, and TEC values may be totally cancelled from equations for determining ionospheric delay, similarly as described above.

With the increasing number of constellations transmitting at different frequencies and separated out sufficiently in frequency, embodiments of the present invention use satellites that are close to each other in azimuth and elevation, i.e., within a predetermined distance to each other, and considers the two satellites as tracking dual frequencies with slight modifications, as will be described below.

Figure 1:
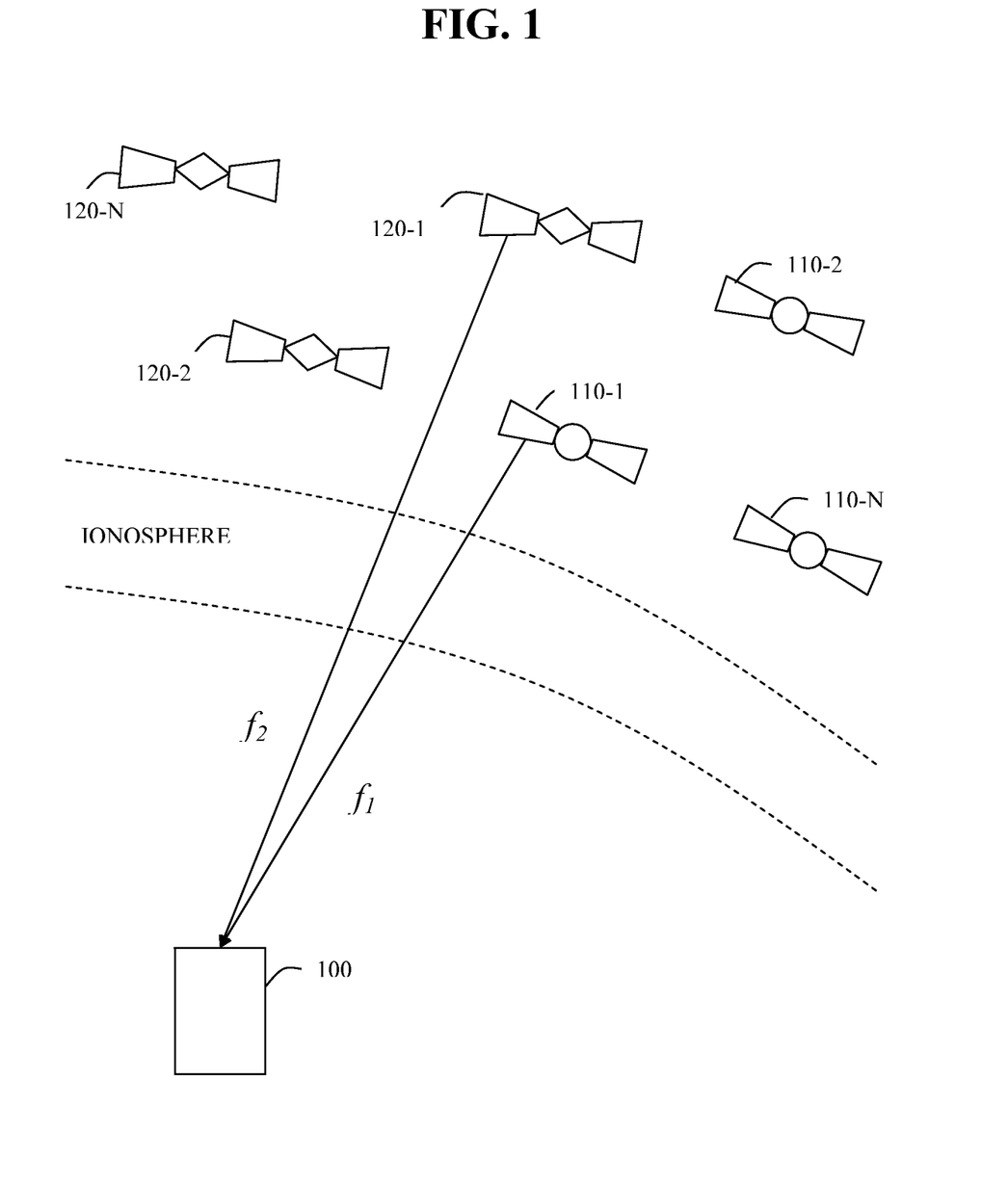
FIG. 1 illustrates a navigation system including multi constellation GNSSs according to an embodiment of the present invention.

FIG. 1 illustrates a navigation system including multi constellation GNSSs according to an embodiment of the present invention.

Referring to FIG. 1, the navigation system includes a single frequency GNSS receiver 100, a first GNSS constellation including satellites 110-1, 110-2, . . . , 110-N, and a second GNSS constellation including satellites 120-1, 120-2, . . . , 120-N. Different from the examples above, $f_1$ and $f_2$ in FIG. 1 represent a frequency of a first signal from a first satellite in a first constellation, i.e., satellite 110-1, and a frequency of a second signal from a second satellite in a second constellation, i.e., satellite 120-1, respectively.

Again, $\Delta_1$ and $\Delta_2$ represent errors, i.e., ionospheric errors, at frequencies $f_1$ and $f_2$, respectively.

$$\Delta_1 = \rho_1 - R_1 = -40.3 \frac{TEC}{f_1^2} \text{ and } \Delta_2 = \rho_2 - R = -40.3 \frac{TEC}{f_2^2},$$

where $\rho_1$ and $\rho_2$ are the pseudo range distances computed at the frequencies $f_1$ and $f_2$, and similarly $R_1$ and $R_2$ are the true geometric ranges of the satellites 110-1 and 120-1 to the receiver 100.

Because both satellites 110-1 and 120-1 are close to each other, e.g., within a certain azimuth and elevation angle, the paths of the signals transmitted therefrom cross the ionosphere very similarly. As a result, the TEC is common between the two signal paths and can be cancelled by the receiver 100.

As a result, $$\frac{\Delta_1}{\Delta_2} = \frac{f_2^2}{f_1^2}$$

and $\Delta_1 - \Delta_2 = (\rho_1 - R_1) - (\rho_2 - R_2) = (\rho_1 - \rho_2) - (R_1 - R_2)$. Further, $\Delta_1$ can then be obtained as shown below in Equation (15).

$$\Delta_1 = \left(\frac{f_2^2}{f_2^2 - f_1^2}\right)((\rho_1 - \rho_2) - (R_1 - R_2)) \quad (15)$$

As shown above, all of the quantities of Equation (15) are either known or can be measured, with TEC values totally cancelled from the equation, such that the ionospheric delay can be calculated by the receiver 100.

After obtaining the ionospheric delay, this ionospheric delay may be compensated for during signal reception.

Figure 2:
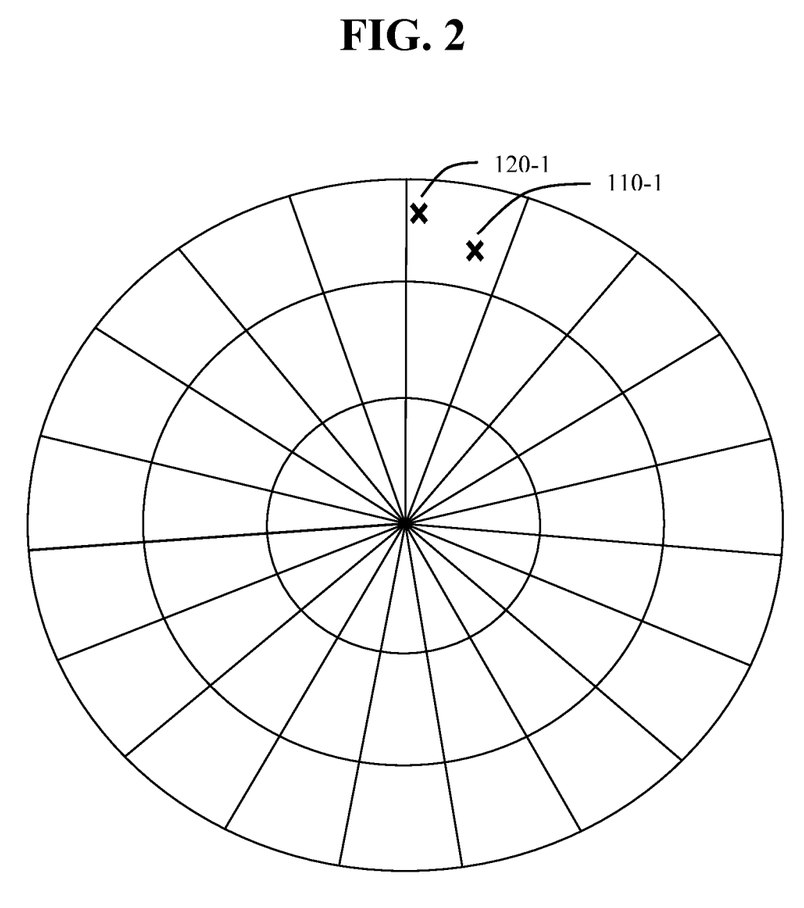
FIG. 2 illustrates a radar view in which an azimuth and elevation are divided into sectors according to an embodiment of the present invention.

FIG. 2 illustrates a radar view in which an azimuth and elevation are divided into sectors according to an embodiment of the present invention. For example, the plurality of sectors are formed by dividing at least a portion of the azimuth plane into a plurality of azimuth divisions, dividing at least a portion of the azimuth plane into a plurality of elevations, or dividing at least a portion of the azimuth plane into a plurality of azimuth divisions and one or more elevations, where each sector of the plurality of sectors is formed by the boundaries of an azimuth division and the one or more elevations.

Referring to FIG. 2, because the satellites 110-1 and 120-1 fall within the same sector, they are considered close to each other.

TABLE 1

| SYSTEM | SIGNAL i | FREQUENCY (MHz) $f_i$ |
|---|---|---|
| GPS | L1 | 1575.42 |
| GLO(G1) | −7 | 1598.0625 |
|  | −6 | 1598.625 |
|  | −5 | 1599.1875 |
|  | −4 | 1599.75 |
|  | −3 | 1600.3125 |
|  | −2 | 1600.875 |
|  | −1 | 1601.4375 |
|  | 0 | 1602 |
|  | 1 | 1602.5625 |
|  | 2 | 1603.125 |
|  | 3 | 1603.6875 |
|  | 4 | 1604.25 |
|  | 5 | 1604.8125 |
|  | 6 | 1605.375 |
| GAL | E1 | 1575.42 |
| BDS | B1 | 1561.098 |

Table 1 shows examples of frequencies that a single frequency receiver 100 according to an embodiment of the present invention can acquire and track.

Accordingly, using the above-described method along with a Beidou (BDS) Satellite Vehicle (SV) and a GLO-NASS (GLO(G1)) (frequency slot 6) SV, which are in the same azimuth and elevation sector, i.e., are close to each other, then the ionospheric delay can be computed as shown below.

Because the two frequencies are $f_2$=1605.375 MHz and $f_1$=1561.098 MHz, respectively, $$\Delta_1 = \left(\frac{1605.375^2}{1605.375^2 - 1561.098^2}\right)((\rho_1 - \rho_2) - (R_1 - R_2))$$

and $\Delta_1$=(18.38)*(($\rho_1-\beta_2$)−($R_1-R_2$)).

Accordingly, $\Delta_1$ would be equal to 18.38 times the difference between the pseudo ranges and true ranges.

Similarly, repeating the calculation with a Beidou SV and a GLONASS (freq slot~7) SV, $\Delta_1$ would be 21.869 times the difference between the pseudo ranges and true ranges.

Although this method is sensitive to the pseudo range noise, ionospheric delay compensation can be achieved, without the complexity or cost of using dual frequency receivers.

Figure 3:
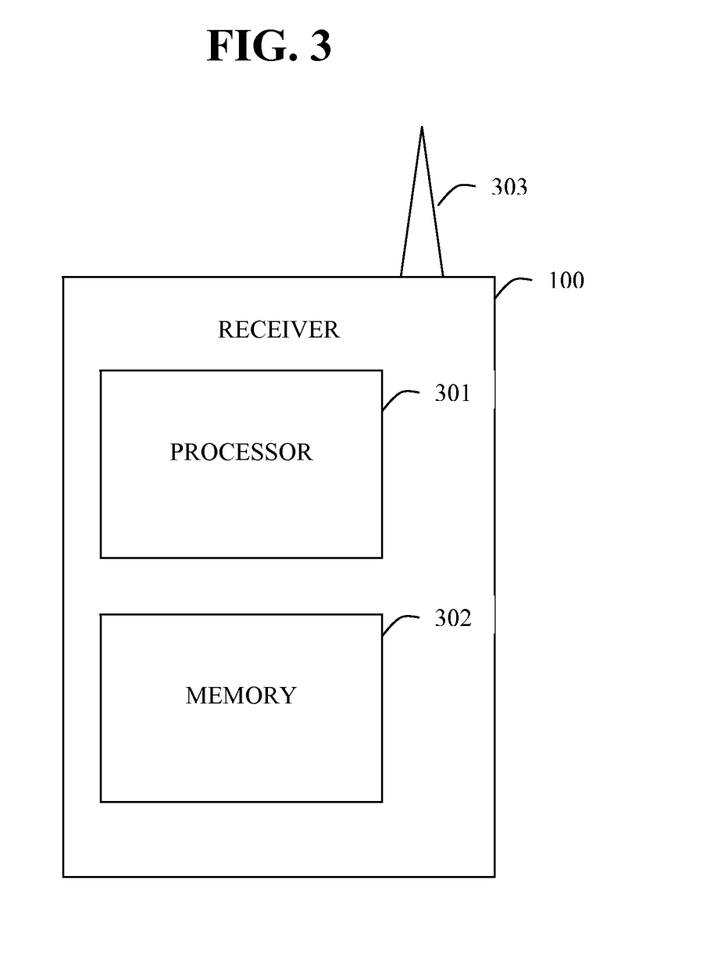
FIG. 3 is block diagram illustrating a single path receiver according to an embodiment of the present invention.

FIG. 3 is block diagram illustrating a single path GNSS receiver according to an embodiment of the present invention.

Referring to FIG. 3, the receiver 100 includes a processor 301, a memory 302, and an antenna 303. The antenna 303 receives a first signal at a first frequency $f_1$ from a first satellite in a first GNSS constellation, e.g., satellite 110-1, and a second signal at a second frequency $f_2$ from a second satellite in a second GNSS constellation, e.g., satellite 120-1.

The memory 302, e.g., a non-transitory computer-readable medium, stores program instructions, e.g., software, that control the processor 301 to calculate the ionospheric delay using the received first signal and the received second signal. Any such software may be stored, for example, in a volatile or non-volatile storage device such as a Read-Only Memory (ROM), a memory such as a Random Access Memory (RAM), a memory chip, a memory device, or a memory IC, or a recordable optical or magnetic medium such as a Compact Disc (CD), a Digital Video Disc (DVD), a magnetic disk, or a magnetic tape, regardless of its ability to be erased or its ability to be re-recorded. It can be also appreciated that the memory 302 included in the receiver 100 is one example of machine-readable devices suitable for storing a program including instructions that are executed by the processor 301 to thereby implement embodiments of the present invention.

The processor 301 calculates the ionospheric delay from the received first signal and the received second signal using Equation (15), as described above.

Accordingly, the present invention includes a program for a code implementing the apparatus and method described in the appended claims of the specification and a machine (a computer or the like)-readable storage medium for storing the program. Moreover, such a program as described above can be electronically transferred through an arbitrary medium such as a communication signal transferred through cable or wireless connection, and the present invention properly includes the things equivalent to that.

Figure 4:
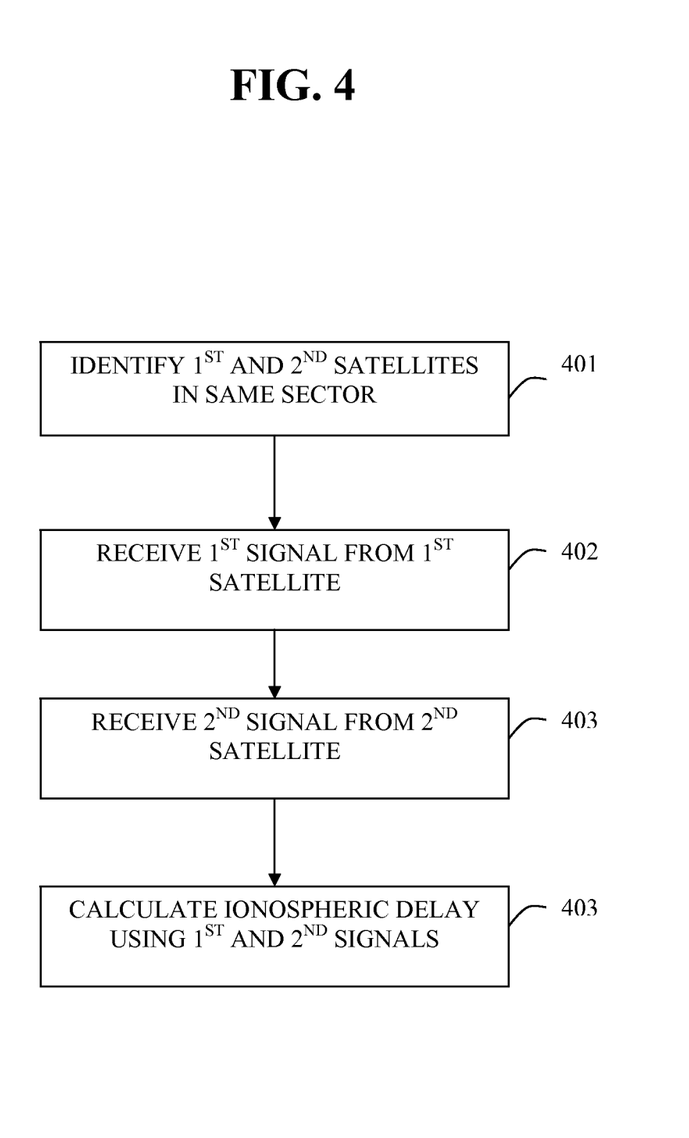
FIG. 4 is flowchart illustrating a method of calculating ionospheric delay in a single frequency receiver according to an embodiment of the present invention.

FIG. 4 is flowchart illustrating a method of calculating ionospheric delay in a single frequency GNSS receiver according to an embodiment of the present invention.

Referring to FIG. 4, in step 401, the receiver 100 identifies a first satellite a first satellite in a first GNSS constellation and from a second satellite in a second GNSS constellation are close to each other, i.e., within a predetermined distance from each other. For example, as described above, the receiver 100 may identify that the first satellite and the second satellite are within the predetermined distance from each other when they are positioned within a same sector among a plurality of sectors in an azimuth plane.

Alternatively, the receiver 100 may identify that the first satellite and the second satellite are within the predetermined distance from each other by determining a first azimuth and elevation of the first satellite, determining a second azimuth and elevation of the second satellite, and then comparing the determined first azimuth and elevation to the determined second azimuth and elevation.

In step 402, the receiver 100 receives a first signal at a first frequency $f_1$ from a first satellite in a first GNSS constellation, e.g., satellite 110-1, and in step 403, receives a second signal at a second frequency $f_2$ from a second satellite in a second GNSS constellation, e.g., satellite 120-1.

Thereafter, in step 404, the receiver 100 calculates the ionospheric delay using the received first signal and the received second signal, using Equation (15), as described above.

In accordance with the above-described embodiments of the present invention, a method, apparatus, and system are provided in which ionospheric delay is measured by a single frequency receiver using signals received from two satellites across different constellations, wherein the two satellites are in close enough proximity and transmitting at different frequencies, thereby eliminating any computations pertaining to obliquity or TEC computations.

While the present invention has been particularly shown and described with reference to certain embodiments thereof, it will be understood by those of ordinary skill in the art that various changes in form and details may be made therein without departing from the spirit and scope of the present invention.

What is claimed is:

1. A method for a single Radio Frequency (RF) path receiver to compensate for ionospheric delay in multi constellation Global Navigation Satellite Systems (GNSSs), the method comprising:
   identifying that a first satellite in a first GNSS constellation and a second satellite in a second GNSS constellation are within a predetermined distance from each other;
   receiving a first signal at a first frequency from the first satellite;
   receiving a second signal at a second frequency from the second satellite; and
   calculating the ionospheric delay using the received first signal and the received second signal,
   wherein identifying that the first satellite and the second satellite are within the predetermined distance from each other comprises identifying that the first satellite and the second satellite are positioned within a same sector among a plurality of sectors in an azimuth plane.

2. The method of claim 1, wherein the ionospheric delay is calculated using:

$$\Delta_1 = \left(\frac{f_2^2}{f_2^2 - f_1^2}\right)((\rho_1 - \rho_2) - (R_1 - R_2)),$$

where $\Delta_1$ represents the ionospheric delay, $f_1$ represents the first frequency, $f_2$ represents the second frequency, $\rho_1$ is a first pseudo range distance computed at the first frequency $f_1$, $\rho_2$ is a second pseudo range distance computed at the second frequency $f_2$, $R_1$ is a first true geometric range of the first satellite to the receiver, and $R_2$ is a second true geometric range of the second satellite to the receiver.

3. The method of claim 1, wherein identifying that the first satellite and the second satellite are within the predetermined distance from each other further comprises:
   determining a first azimuth and elevation of the first satellite;
   determining a second azimuth and elevation of the second satellite; and
   comparing the determined first azimuth and elevation to the determined second azimuth and elevation.

4. The method of claim 1, wherein the plurality of sectors are formed by dividing at least a portion of the azimuth plane into a plurality of azimuth divisions.

5. The method of claim 1, wherein the plurality of sectors are formed by dividing at least a portion of the azimuth plane into a plurality of elevations.

6. The method of claim 1, wherein the plurality of sectors are formed by dividing at least a portion of the azimuth plane into a plurality of azimuth divisions and one or more elevations,
   where each sector of the plurality of sectors is formed by the boundaries of an azimuth division and the one or more elevations.

7. A single Radio Frequency (RF) path receiver that compensates for ionospheric delay in multi constellation Global Navigation Satellite Systems (GNSSs), the receiver comprising:
   an antenna configured to receive a first signal at a first frequency from a first satellite in a first GNSS constellation, and to receive a second signal at a second frequency from a second satellite in a second GNSS constellation;
   a processor; and
   a non-transitory computer-readable medium having program instructions recorded thereon, the program instructions configured for the processor to
      identify that the first satellite and the second satellite are within a predetermined distance from each other; and
      calculate the ionospheric delay using the received first signal and the received second signal,
   wherein the processor identifies that the first satellite and the second satellite are within the predetermined distance from each other by identifying that the first satellite and the second satellite are positioned within a same sector among a plurality of sectors in an azimuth plane.

8. The receiver of claim 7, wherein the processor calculates the ionospheric delay using:

$$\Delta_1 = \left(\frac{f_2^2}{f_2^2 - f_1^2}\right)((\rho_1 - \rho_2) - (R_1 - R_2)),$$

where $\Delta_1$ represents the ionospheric delay, $f_1$ represents the first frequency, $f_2$ represents the second frequency, $\rho_1$ is a first pseudo range distance computed at the first frequency $f_1$, $\rho_2$ is a second pseudo range distance computed at the second frequency $f_2$, $R_1$ is a first true geometric range of the first satellite to the receiver, and $R_2$ is a second true geometric range of the second satellite to the receiver.

9. The receiver of claim 7, wherein the processor further identifies that the first satellite and the second satellite are within the predetermined distance from each other by determining a first azimuth and elevation of the first satellite, determining a second azimuth and elevation of the second satellite, and comparing the determined first azimuth and elevation to the determined second azimuth and elevation.

10. The receiver of claim 7, wherein the plurality of sectors are formed by dividing at least a portion of the azimuth plane into a plurality of azimuth divisions.

11. The method of claim 7, wherein the plurality of sectors are formed by dividing at least a portion of the azimuth plane into a plurality of elevations.

12. The method of claim 7, wherein the plurality of sectors are formed by dividing at least a portion of the azimuth plane into a plurality of azimuth divisions and one or more elevations, and
   wherein each sector of the plurality of sectors is formed by boundaries of an azimuth division and the one or more elevations.

13. A navigation system, comprising:
   a first satellite in a first Global Navigation Satellite Systems (GNSS) constellation;
   a second satellite in a second GNSS constellation; and
   a single Radio Frequency (RF) path receiver configured to receive a first signal at a first frequency from the first satellite, receive a second signal at a second frequency from the second satellite, and calculate ionospheric delay using the received first signal and the received second signal,
   wherein the receiver identifies that the first satellite and the second satellite are within a predetermined distance from each other, when the first satellite and the second satellite are positioned within a same sector among a plurality of sectors in an azimuth plane.

14. The system of claim 13, wherein the receiver calculates the ionospheric delay using:

$$\Delta_1 = \left(\frac{f_2^2}{f_2^2 - f_1^2}\right)((\rho_1 - \rho_2) - (R_1 - R_2)),$$

where $\Delta_1$ represents the ionospheric delay, $f_1$ represents the first frequency, $f_2$ represents the second frequency, $\rho_1$ is a first pseudo range distance computed at the first frequency $f_1$, $\rho_2$ is a second pseudo range distance computed at the second frequency $f_2$, $R_1$ is a first true geometric range of the first satellite to the receiver, and $R_2$ is a second true geometric range of the second satellite to the receiver.

* * * * *